United States Patent
Mueller et al.

(10) Patent No.: US 12,372,150 B2
(45) Date of Patent: Jul. 29, 2025

(54) PRESS FIT BEARING SHOULDER ON GEAR SHAFTS

(71) Applicant: Textron Innovations Inc., Providence, RI (US)

(72) Inventors: Russell L. Mueller, Dallas, TX (US); Charles H. Speller, Oak Point, TX (US)

(73) Assignee: Textron Innovations Inc., Providence, RI (US)

( * ) Notice: Subject to any disclaimer, the term of this patent is extended or adjusted under 35 U.S.C. 154(b) by 171 days.

(21) Appl. No.: 17/979,484

(22) Filed: Nov. 2, 2022

(65) Prior Publication Data
US 2024/0141979 A1    May 2, 2024

(51) Int. Cl.
*F16H 57/022* (2012.01)
*F16C 19/52* (2006.01)
*F02C 7/36* (2006.01)

(52) U.S. Cl.
CPC ......... *F16H 57/022* (2013.01); *F16C 19/525* (2013.01); *F02C 7/36* (2013.01); *F05D 2220/323* (2013.01); *F05D 2260/4031* (2013.01)

(58) Field of Classification Search
CPC .. F16C 29/0607; F16C 33/605; F16H 57/022; F16H 57/0025; F16H 2048/423
See application file for complete search history.

(56) References Cited

U.S. PATENT DOCUMENTS

| | | | | | |
|---|---|---|---|---|---|
| 4,319,789 | A | * | 3/1982 | Irwin | F16C 33/605 384/450 |
| 2008/0264202 | A1 | * | 10/2008 | Mineshima | F16H 57/022 74/606 R |
| 2022/0252144 | A1 | * | 8/2022 | Gilliland | F16C 19/54 |

FOREIGN PATENT DOCUMENTS

| | | | | | |
|---|---|---|---|---|---|
| CN | 1534213 | A | * | 10/2004 | F16H 1/145 |
| CN | 107228184 | A | * | 10/2017 | F16H 57/0412 |
| CN | 110081152 | A | * | 8/2019 | |
| CN | 112524222 | A | * | 3/2021 | B61C 9/00 |
| DE | 102019114618 | A1 | * | 4/2020 | F16C 19/02 |
| DE | 102019121275 | A1 | * | 2/2021 | |
| EP | 1939491 | A1 | * | 7/2008 | F16D 9/06 |
| GB | 2014252 | A | * | 8/1979 | F16C 19/225 |
| WO | WO-2013043822 | A2 | * | 3/2013 | F16C 19/386 |

OTHER PUBLICATIONS

USPTO Machine Translation (retrieved from FIT database) of the Description of DE 102019121275 A1, Orel, Feb. 11, 2021. (Year: 2024).*

* cited by examiner

*Primary Examiner* — Daniel D Yabut
(74) *Attorney, Agent, or Firm* — Frost Brown Todd LLP (57) ABSTRACT

Systems and methods are described for shoulders that can be implemented on shafts in gear systems, such as a drive train. The shoulders, in combination with other components like bearings, or nuts, can help restrict movement of the shaft within the drive train. Use of the shoulders in various embodiments can avoid the need for grind reliefs in corners. Grind reliefs can help in prior art systems where machining or grinding is used at surfaces where raceways of bearings border shoulders that are integrated with the shaft. Grind reliefs create tight spaces where edge breaks are difficult to create. Press-fit shoulders, such as described herein, allow machining and edge break creation on the shaft prior to installation of the shoulder.

18 Claims, 11 Drawing Sheets

PRESS FIT BEARING SHOULDER ON GEAR SHAFTS

STATEMENT REGARDING FEDERALLY SPONSORED RESEARCH OR DEVELOPMENT

This invention was made with U.S. Government support under Agreement No. W9124P-19-9-0001 awarded by the Army Contracting Command-Redstone Arsenal to the AMTC and a related AMTC Project Agreement 19-08-006 with Bell Textron Inc. The Government has certain rights in the invention.

TECHNICAL FIELD

The present disclosure is directed to gear systems.

BACKGROUND OF THE INVENTION

Current gear shaft designs often use roller bearings to support the gear. These systems often need shoulders on the gear shaft to keep the gear centered in the geartrain. These shoulders require a grind relief undercut that keeps the grinding tool from overheating/burning the corners at the intersection of the raceway and shoulder and locally compromising the integrity of the gear material. In some instances where the bearing is lubricated from under the raceway, there are oil passages located in the grind relief corners in order to keep the passages out of the path of the roller bearing. This inherently can become a location for sharp edges that are difficult to edge break and prone to higher stress concentrations.

BRIEF SUMMARY OF THE INVENTION

One embodiment under the present disclosure comprises a gear system. The gear system can comprise a shaft comprising a gear, the shaft comprising, on each side of the gear; a first region with a first radius; a second region with a second radius larger than the first radius, the second region coupled to the first region by a first slope; a third region with a third radius larger than the second radius, the third region coupled to the second region by a second slope; wherein the third region is closest to the gear. The system can further comprise a shoulder coupled to each second region, each shoulder pressed onto the shaft and configured to have an interference fit with the second region, and further configured to be stopped by the second slope. It can further comprise a bearing coupled about the shaft at each first region; wherein each shoulder is configured to restrain movement of the shaft within a drive train.

Another embodiment under the present disclosure comprises a method of building a gear system. The method can comprise providing a shaft comprising a gear. It can further comprise pressing one or more shoulders onto the shaft, the one or more shoulders configured to have an interference fit with the shaft. The shaft can be characterized by comprising a first region with a first radius; a second region with a second radius larger than the first radius, the second region coupled to the first region by a first slope; and a third region with a third radius larger than the second radius, the third region coupled to the second region by a second slope, wherein the third region is closest to the gear. The shoulder(s) can be configured to have an interference fit with the second region and to be stopped by the second slope.

A further embodiment can comprise a method of operating a gear system. The method can comprise driving, with a power source, a shaft within the gear system, the shaft comprising a gear and having one or more shoulders pressed onto it. The method can further comprise transferring power from the gear to another component. The shaft can be characterized by comprising, on each side of the gear; a first region with a first radius; a second region with a second radius larger than the first radius, the second region coupled to the first region by a first slope; and a third region with a third radius larger than the second radius, the third region coupled to the second region by a second slope, wherein the third region is closest to the gear. The one or more shoulders can be configured to have an interference fit with the second region and to be stopped by the second slope.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1A:
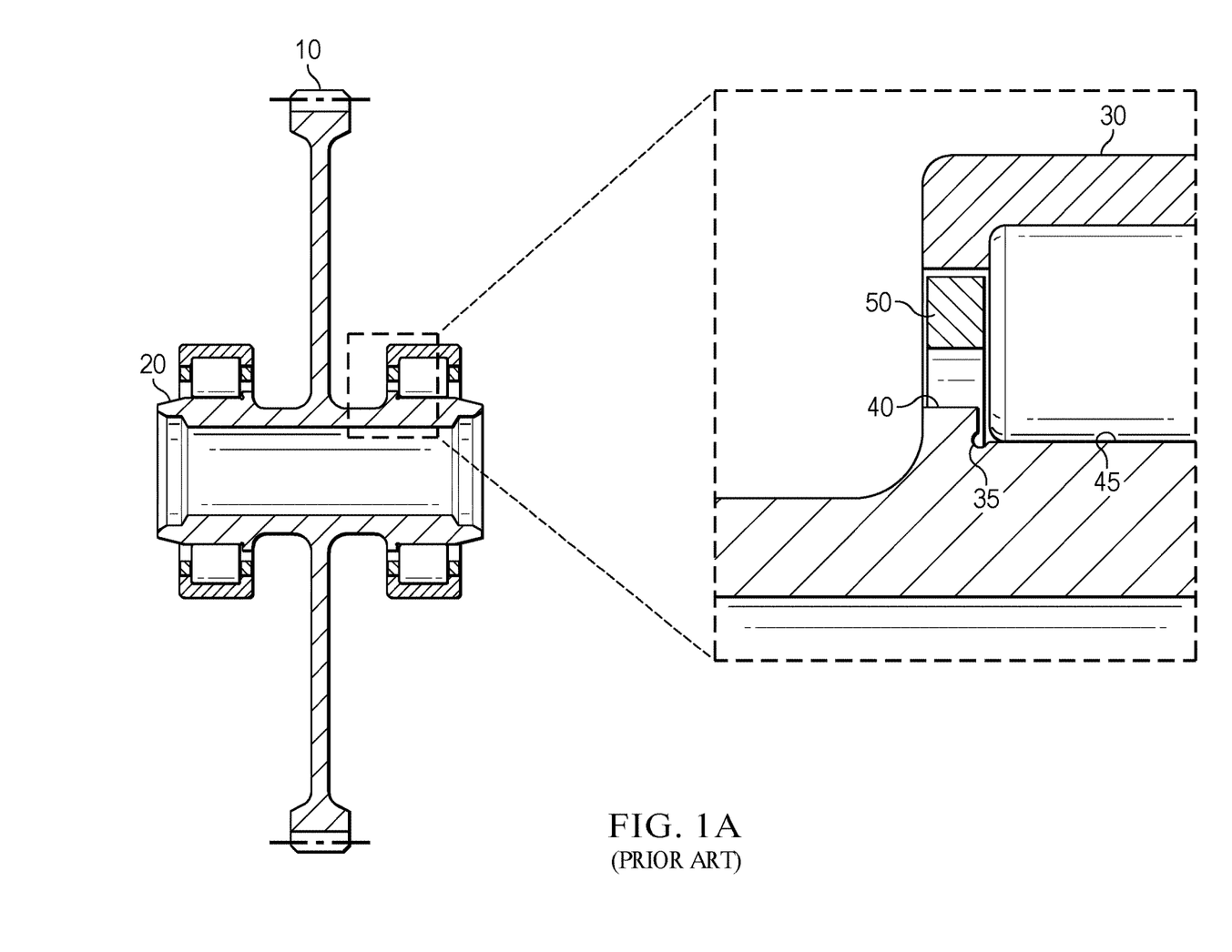
FIGS. 1A-1B are diagrams of prior art integrated shoulders on a shaft.
Figure 1B:
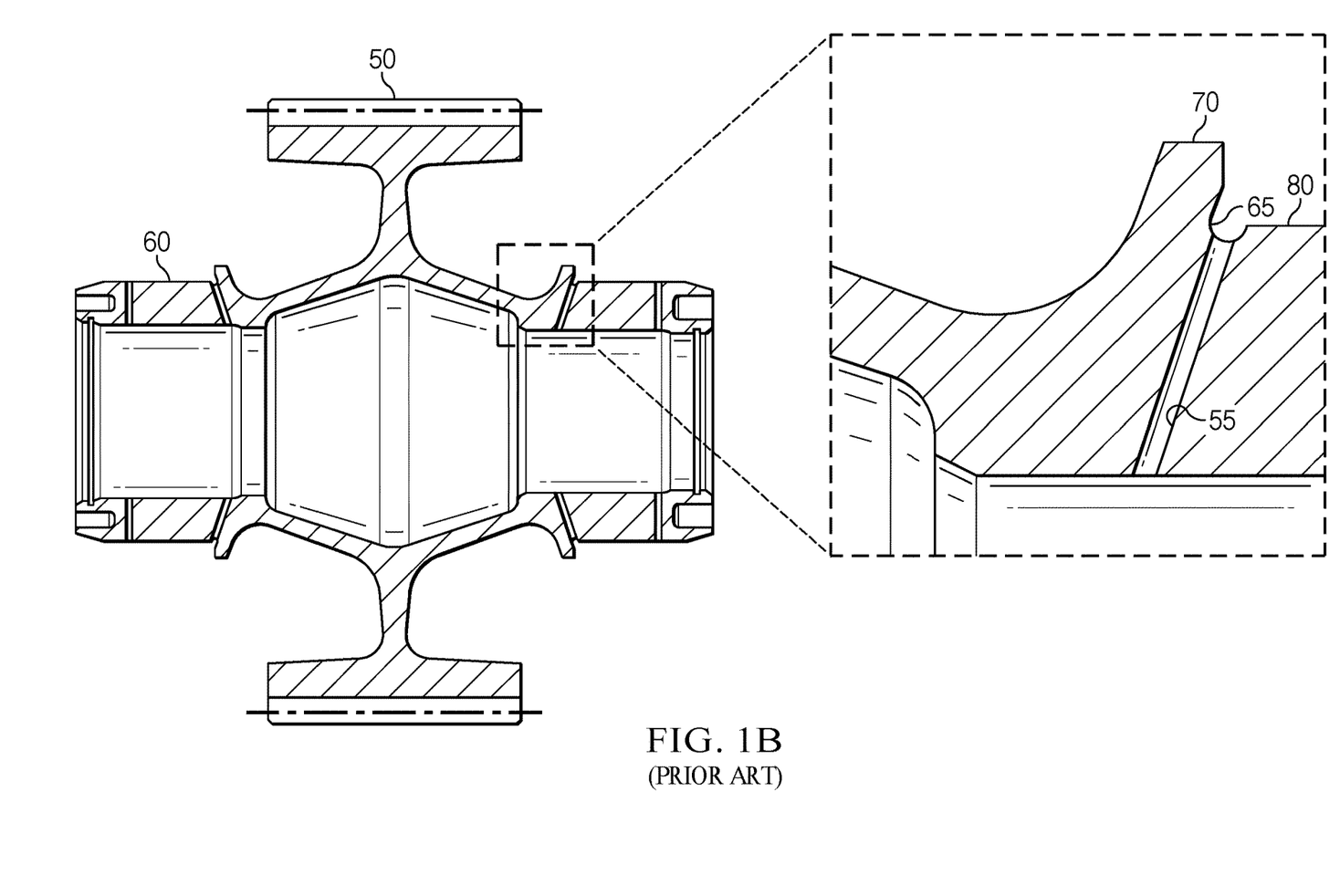

FIGS. 1A and 1B illustrate prior art gear systems that use roller bearings to help support a gear. They further illustrate shoulders on the gears used to help center the gears within the geartrain and with respect to the roller bearings. FIGS.

1A and 1B are cross-sectional views. Referring to FIG. 1A, gear 10 is on a shaft 20. Two roller bearings 30 support shaft 20. The raceway 45 of roller bearing 30 borders the shaft 20. Bearing 50 is shown partially in cross-section. Shoulder 40 helps center the gear 10 within the geartrain and with respect to roller bearings 30. Grind relief 35 is created so as to avoid stresses and elevated temperatures at the interior joint or seam where the raceway 45 of roller bearing 30 meets shoulder 35. In some geartrain embodiments, such as shown in FIG. 1B, there is an oil passage 55 that helps to circulate oil or lubricant within the geartrain. FIG. 1B shows gear 50 on shaft 60. Raceway 80 of a roller bearing rests on shaft 60 and shoulder 70 centers gear 50 within the geartrain. Grind relief 65 helps prevent stresses and elevated temperatures at the corner where it's located.

Figure 2A:
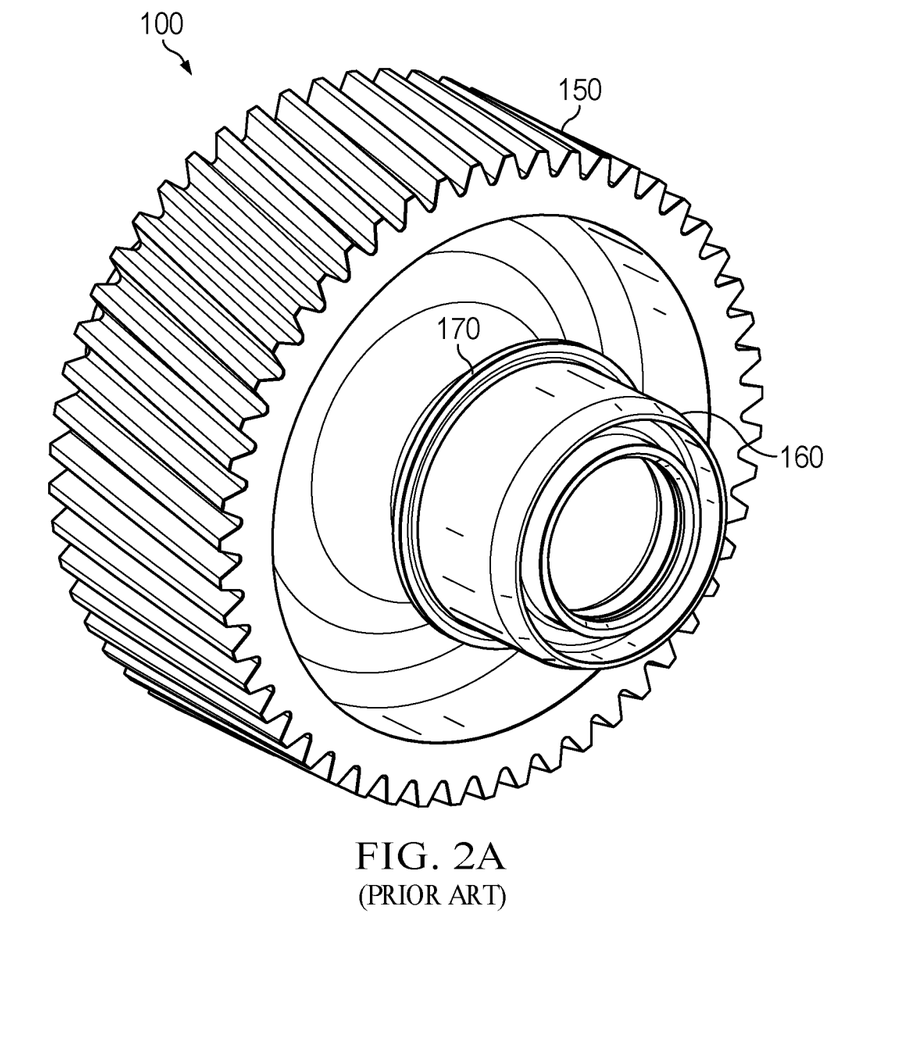
FIGS. 2A-2C are diagrams of prior art integrated shoulders on a shaft.
Figure 2B:
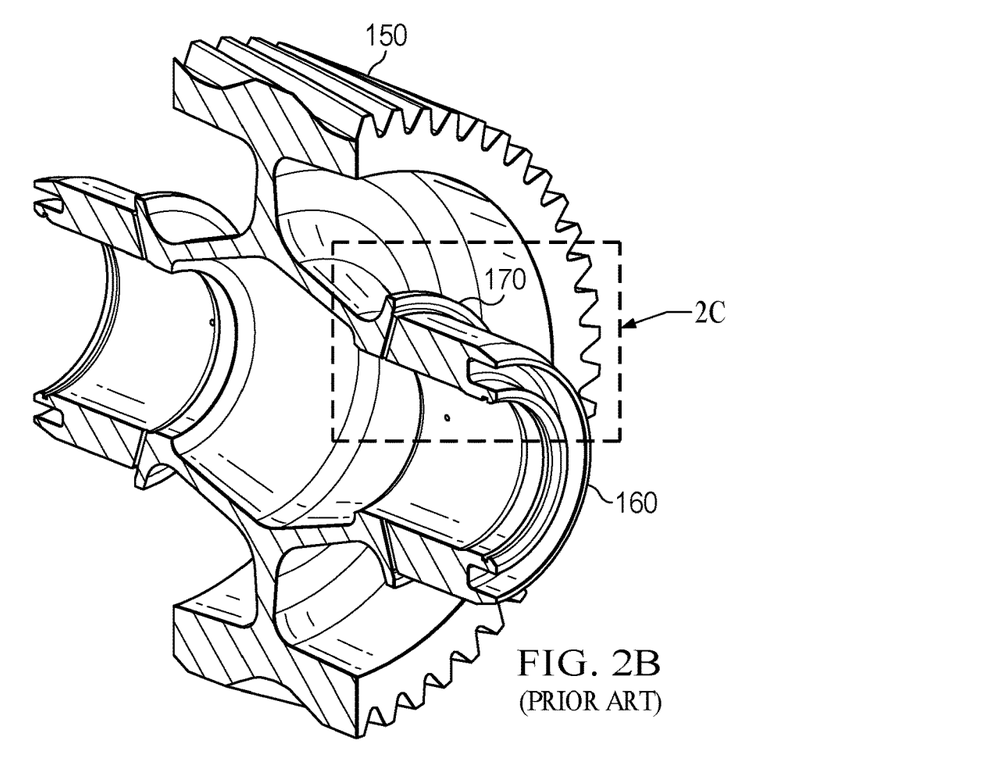
Figure 2C:
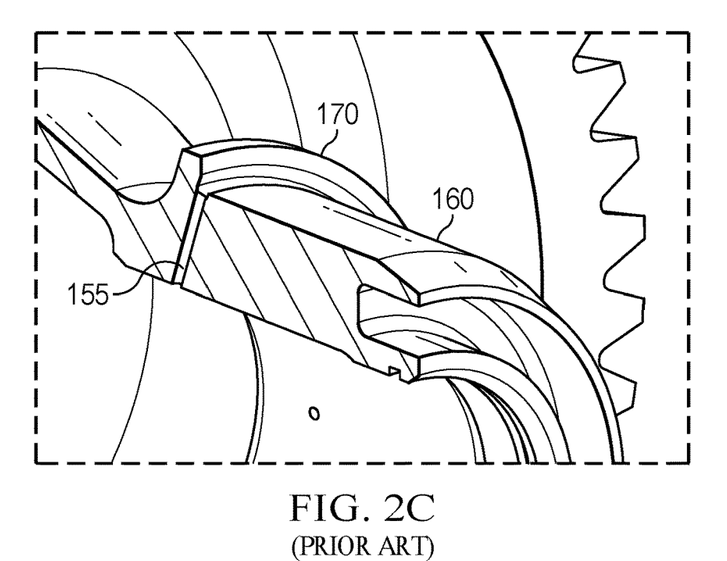
Figure 3:
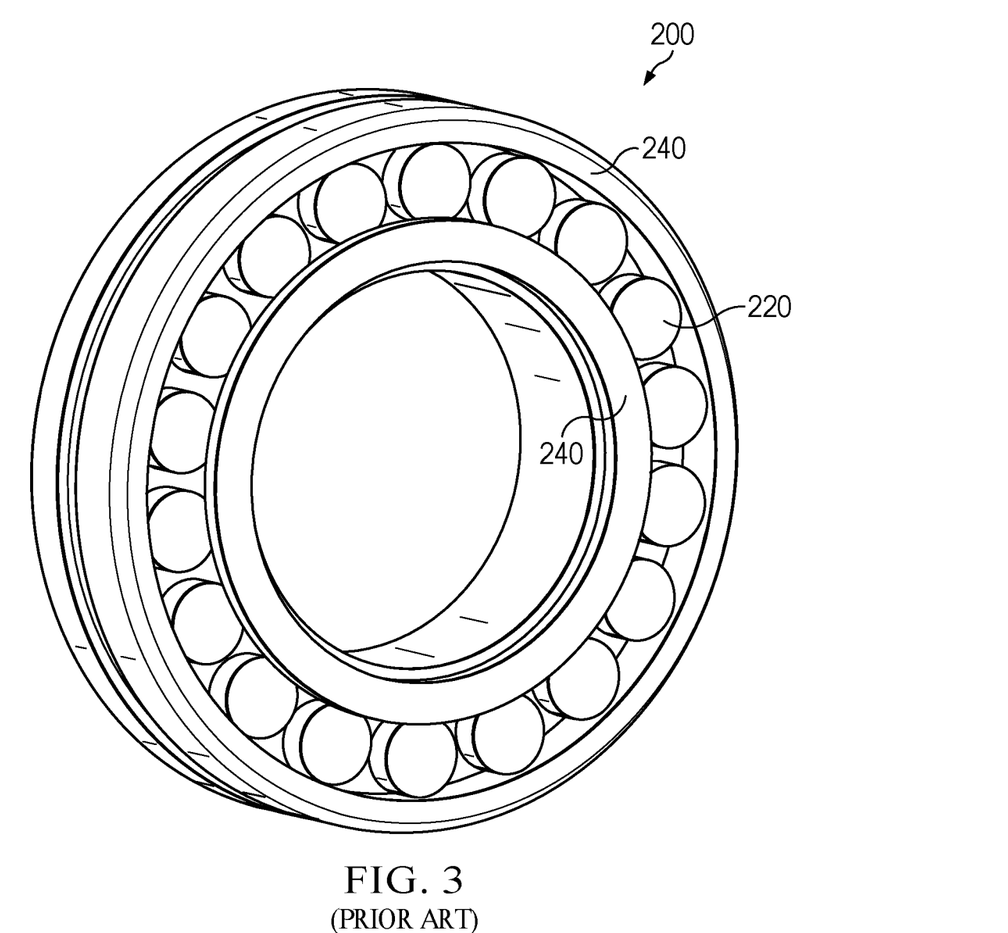
FIG. 3 is a diagram of a prior art bearing.

FIGS. 2A-2C show perspective and cut away views of the prior art embodiment shown in FIG. 1B. System 100 comprises gear 150 coupled to shaft 160. Shoulder 170 is located next to oil passage 155. A possible roller bearing, such as shown in FIGS. 1A and 1B, is shown in FIG. 3. Roller bearing 200 has multiple bearings 220 housed within raceway 240.

Grind reliefs 35, 65 of FIGS. 1A and 1B are required so that a grinding tool does not overheat or burn the corners during machining, which would compromise the integrity of the gear material. Where the grind relief 65 is combined with a passage 55, there can be sharp edges that are difficult to edge break and become prone to higher stress concentrations.

Figure 4:
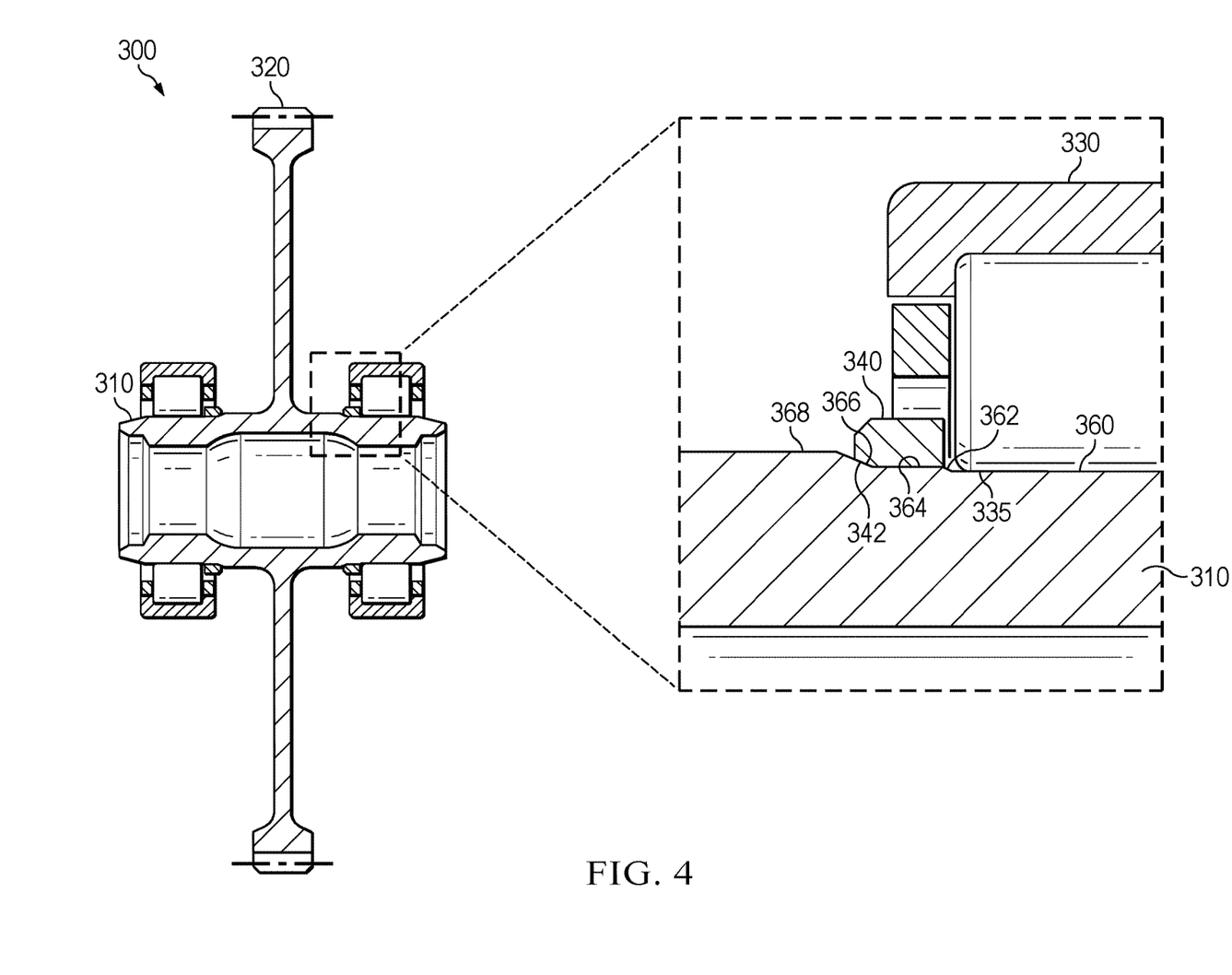
FIG. 4 is a diagram of a shaft and gear embodiment under the present disclosure.
Figure 5:
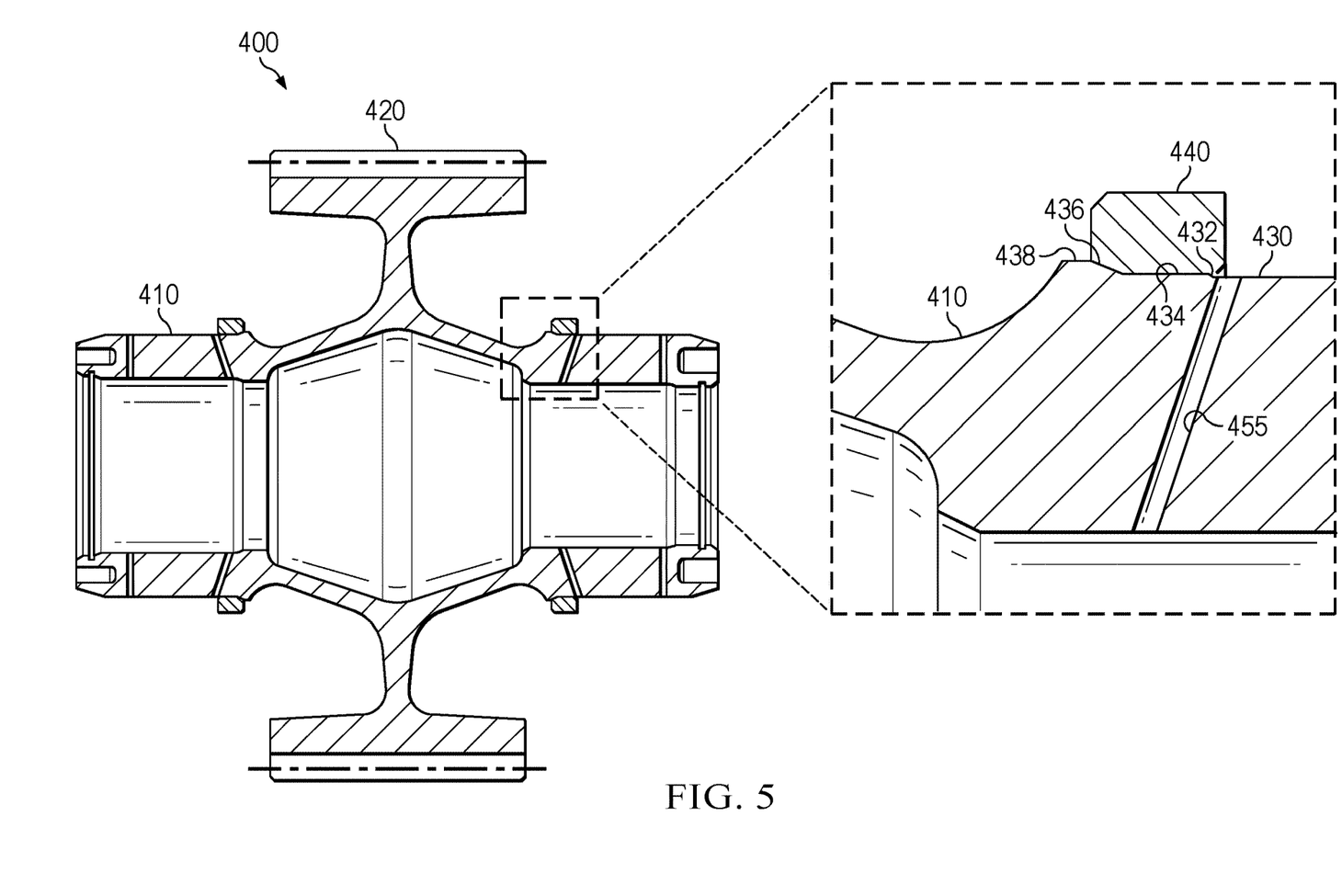
FIG. 5 is a diagram of a shaft and gear embodiment under the present disclosure.

FIGS. 4 and 5 illustrate possible embodiments under the present disclosure that address at least some of the problems identified in the prior art. One of the benefits of these embodiments is to eliminate the grind relief and/or undercut that may result from machining in a corner along a shoulder that is integrated into a shaft. Eliminating the undercut removes a significant stress concentration in a carburized region that has a low tolerance for flaws. This can help aircraft, for example, meet certain safety regulations for flaw tolerance. The embodiments can also improve capability without an associated weight increase.

FIG. 4 illustrates a possible embodiment of a gear system 300 that is similar in some ways to FIG. 1A. Gear 320 is on shaft 310. Roller bearings 330 and shoulders 340 help to center the gear 320 on shaft 310. System 300 achieves centering of the gear 320 via other means than the grind relief and related components of FIGS. 1A-1B. Shaft 310 comprises, along its surface, first region 360, first slope 362, second region 364, second slope 366, and third region 368. As measured by radius from the center of shaft 310, first region 360 has the smallest radius, second region 364 has a slightly larger radius than the first region 360, and the third region 368 has a slightly larger radius than the second region 364. First slope 362 is a slope from the first region 360 to the second region 364. Second slope 366 is a slope from the second region 364 to the third region 368. Shoulder 340 is sized with a radius so that it can fit around first region 360 and first slope 362, and then have a tight or interference fit with second region 364. Shoulder 340 has a sloped region 342 that engages second slope 366 and helps prevent shoulder 340 from sliding further down the shaft (leftward in this view). In this embodiment, the entire shaft 310, and regions and slopes 360-368, can be machined as desired to rigorous tolerances. During machining there is no corner that undergoes potentially weakening stresses. Similarly, shoulder 340, which can be machined separately from shaft 310, will not have to undergo the potentially deleterious machining process that creates the embodiments of FIGS. 1A-1B (and is only resolved with grind reliefs). After being machined separately, shoulder 340 can placed around the end of shaft 310 and pressed down to the position shown in FIG. 4.

FIG. 5 illustrates a possible embodiment of a gear system 400 that is similar in some ways to FIG. 1B. Gear 420 is on shaft 410. Shoulders 440 help to center gear 420 on shaft 410. System 400 achieves centering of the gear 420 via other means than the grind relief and related components of FIGS. 1A-1B. Shaft 410 comprises, along its surface, first region 430, first slope 432, second region 434, second slope 436, and third region 438. As measured by radius from the center of shaft 410, first region 430 has the smallest radius, second region 434 has a slightly larger radius than the first region 430, and the third region 438 has a slightly larger radius than the second region 434. Second slope 432 is a slope from the first region 430 to the secon region 434. Second slope 436 is a slope from the second region 434 to the third region 438. Shoulder 440 is sized with a radius so that it can fit around first region 430 and first slope 432, and then have a tight or interference fit with second region 434. Shoulder 440 has a sloped region 442 that engages second slope 436 and helps prevent shoulder 440 from sliding further down the shaft (leftward in this view). Similar to the embodiment shown in FIG. 4, system 400 allows for more precise machining, without the need for a grind relief as shown in FIGS. 1A-1B. In system 400, the oil passages 455 can have more precise machining around the holes, with edge breaks to avoid sharp corners.

The gear, shaft, and shoulders described can comprise a variety of materials. In most industrial or vehicle applications a metal will be used. But there could exist embodiments using plastics, composites, or other materials. Steels, alloys, and other similar materials are most common. It is preferred that the shaft and shoulder comprise the same material and/or have the same coefficient of thermal expansion. This will help ensure a tight fit even in changing environments. But different material compositions are possible.

Installation of the shoulder can be accomplished in a variety of ways. Press fitting with an interference fit between the components can be used. Thermal expansion of the shoulder and/or cooling of the gear/shaft can be used as well.

Figure 6:
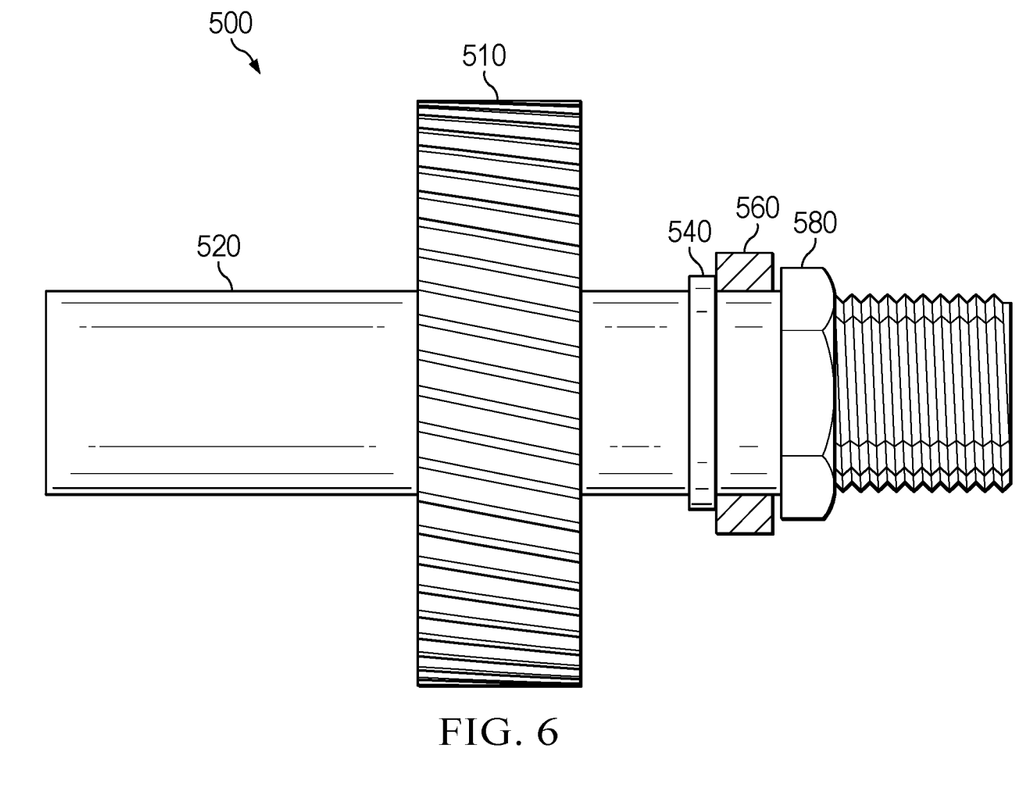
FIG. 6 is a diagram of a shaft and gear embodiment under the present disclosure.

The description of FIGS. 4 and 5 made reference to regions and slopes between those regions which can simplify the installation of the shoulder. But alternate embodiments can include installation of the shoulder on a flat shaft. Press fitting or thermal expansion installation techniques can be used in these embodiments as well. For example, FIG. 6 illustrates an embodiment on a flat shaft. Gear system 500 comprises gear 510 and shaft 520. Shoulder 540 has been installed and borders bearing 560. Nut 580 has been screwed onto shaft 520 and can also assist in centering shaft 520 and gear 520 within a drive system.

The bearings described can comprise a variety of bearings. Embodiments can comprise ball bearings, roller bearings, tapered roller bearings, needle bearings, and other varieties.

Figure 7A:
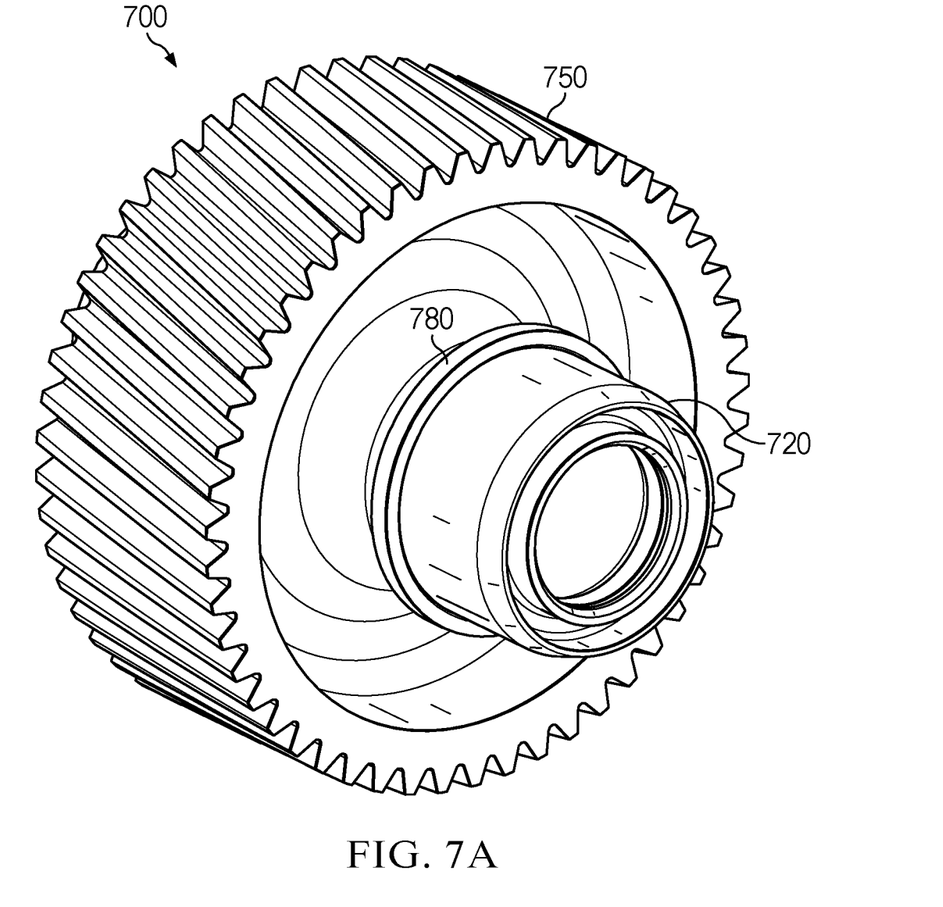
FIGS. 7A-7C are diagrams of a shaft and gear embodiment under the present disclosure.
Figure 7B:
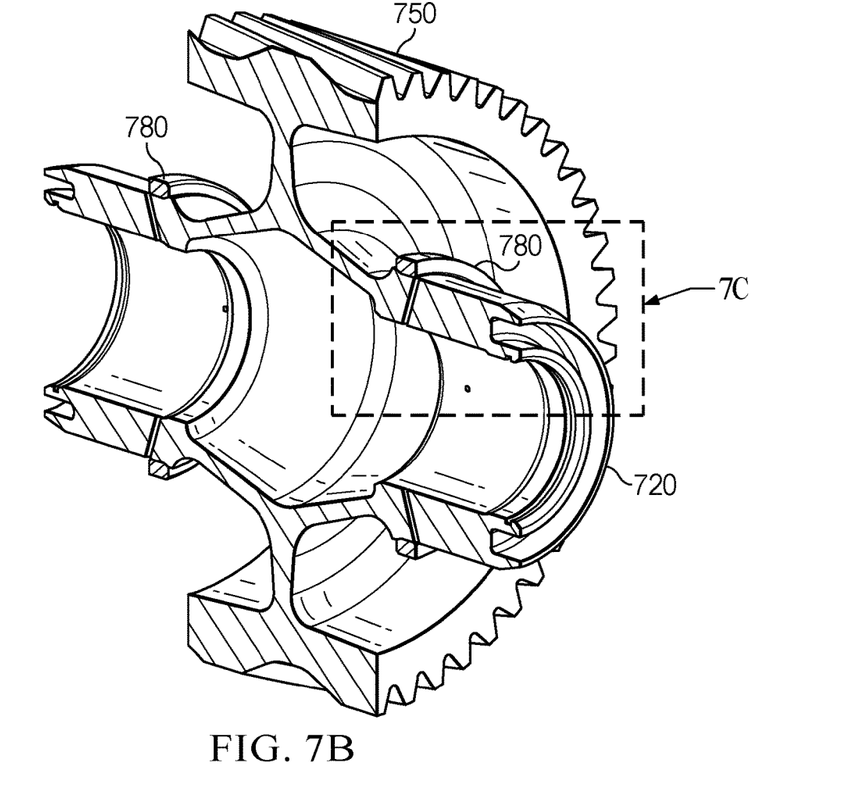
Figure 7C:
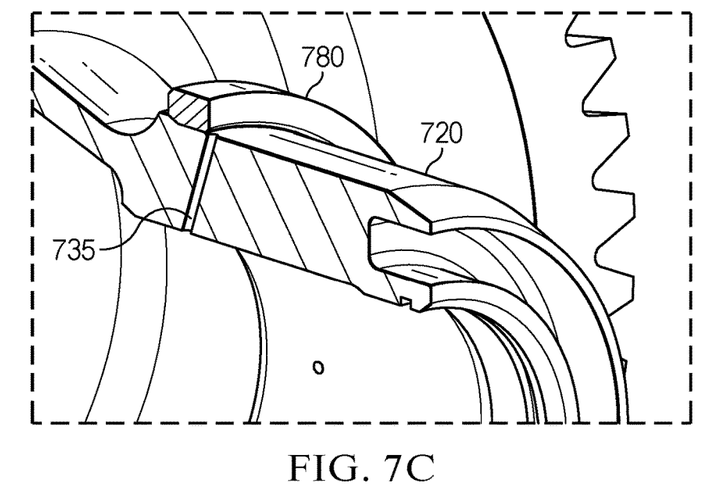

FIGS. 7A-7C illustrate another possible embodiment. System 700 is shown in perspective and cut away views in increasing detail from FIG. 7A to 7C. Gear 750 is coupled to shaft 720. Oil passage 735 helps distribute lubricants throughout the system 700. Shoulder 780, pressed onto shaft 720, is shown. Shaft 720 can have a flat surface or comprise a series of regions of different radii and slopes as described regarding certain embodiments. As shown, the shoulders 780 can be pressed onto shaft 720 from different sides. Bearings, nuts or other components can then be pressed, threaded, or otherwise coupled to the shaft 720 to assist in restricting movement of the shaft 720 and gear 750 within a drive system.

Figure 8:
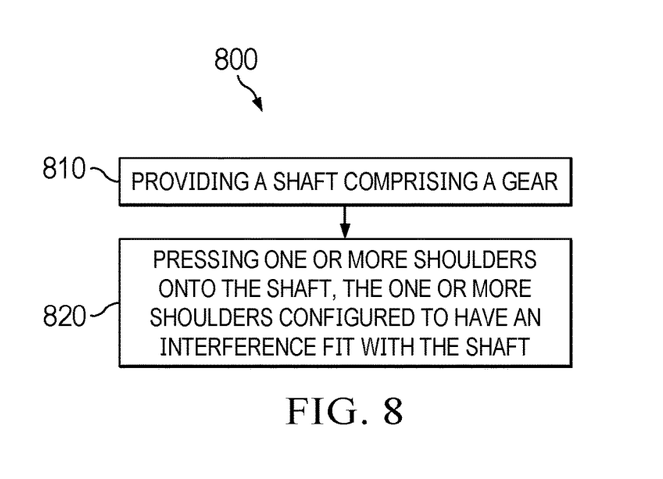
FIG. 8 is a flow chart of a method embodiment under the present disclosure.

FIG. 8 illustrates a possible method embodiment 800 under the present disclosure. Method 800 is a method of building a gear system. Step 810 is providing a shaft comprising a gear. Step 820 is pressing one or more shoulders onto the shaft, the one or more shoulders configured to have an interference fit with the shaft. Method 800 can comprise a variety of additional steps and can have various alterative steps or embodiments. For example, the shaft can be characterized by comprising a first region with a first radius; a second region with a second radius larger than the first radius, the second region coupled to the first region by a first slope; and a third region with a third radius larger than the second radius, the third region coupled to the second region by a second slope, wherein the third region is closest to the gear. The shoulder(s) can be configured to have an interference fit with the second region and to be stopped by the second slope. The method 700 can further comprise coupling a bearing about the shaft outside of the one or more shoulders, wherein each bearing and shoulder are configured to restrain movement of the shaft within a drive system. Alternatively, the shaft can comprise threads, and the method can further comprise coupling a nut to the threads outside of the one or more shoulders. The method can also comprise providing one or more oil passages in the shaft, and/or prior to pressing the shoulder onto each end of the shaft, creating an edge break onto one or more edges of the one or more oil passages. In other embodiments, the shoulder comprises a shoulder slope configured to abut the second slope. In other embodiments the pressing can comprise a thermal expansion process. Other additional steps and variations are possibilities. Method 700 can be used to create a gear system for use in a vehicular drive system or for other types of drive systems.

Figure 9:
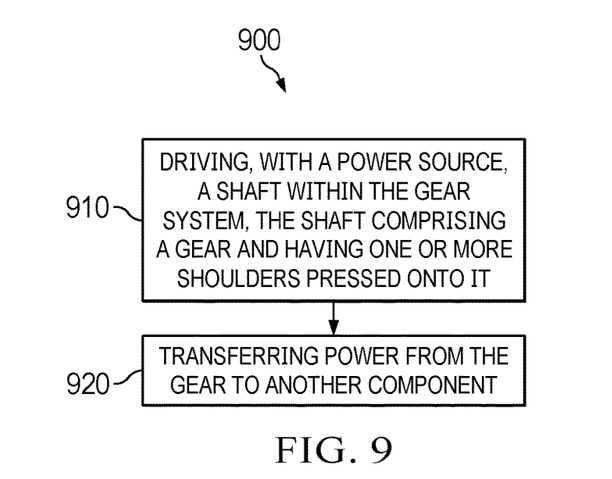
FIG. 9 is a flow chart of a method embodiment under the present disclosure.

FIG. 9 illustrates a possible method embodiment 900 under the present disclosure. Method 900 comprises a method of operating a gear system. Step 910 is driving, with a power source, a shaft within the gear system, the shaft comprising a gear and having one or more shoulders pressed onto it. Step 920 is transferring power from the gear to another component. Method 900 can comprise a variety of additional steps or alternative embodiments. For example, the shaft can comprise, on each side of the gear; a first region with a first radius; a second region with a second radius larger than the first radius, the second region coupled to the first region by a first slope; and a third region with a third radius larger than the second radius, the third region coupled to the second region by a second slope, wherein the third region is closest to the gear. The one or more shoulders can be configured to have an interference fit with the second region and to be stopped by the second slope. The shaft can be coupled to a bearing located outside of the one or more shoulders, wherein each bearing and shoulder are configured to restrain movement of the shaft within a drive system. Alternatively, the shaft can comprise threads, and a nut can be coupled to the threads outside of the one or more shoulders. The shaft can comprise one or more oil passages in the shaft, and one or more edge breaks or chamfers can be created on one or more edges of the one or more oil passages. In other embodiments, the shoulder comprises a shoulder slope configured to abut the second slope. In other embodiments the shoulder can be pressed onto the shaft in a process that includes a thermal expansion process. Other additional steps are possible, as the present disclosure has illustrated in various embodiments. Method 800 can be performed in a drive system for an aircraft or other vehicle. Use in other types of systems that comprise drive trains or various types of drive systems is possible.

Abbreviations and Defined Terms

To assist in understanding the scope and content of this written description and the appended claims, a select few terms are defined directly below. Unless defined otherwise, all technical and scientific terms used herein have the same meaning as commonly understood by one of ordinary skill in the art to which the present disclosure pertains.

The terms "approximately," "about," and "substantially," as used herein, represent an amount or condition close to the specific stated amount or condition that still performs a desired function or achieves a desired result. For example, the terms "approximately," "about," and "substantially" may refer to an amount or condition that deviates by less than 10%, or by less than 5%, or by less than 1%, or by less than 0.1%, or by less than 0.01% from a specifically stated amount or condition.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or embodiments includes a specific reference to one or more embodiments thereof, and vice versa, and is intended to provide illustrative examples without limiting the scope of the present disclosure, which is indicated by the appended claims rather than by the present description.

As used in the specification, a word appearing in the singular encompasses its plural counterpart, and a word appearing in the plural encompasses its singular counterpart, unless implicitly or explicitly understood or stated otherwise. Thus, it will be noted that, as used in this specification and the appended claims, the singular forms "a," "an" and "the" include plural referents unless the context clearly dictates otherwise. For example, reference to a singular referent (e.g., "a widget") includes one, two, or more referents unless implicitly or explicitly understood or stated otherwise. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

CONCLUSION

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

It is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims. The terms and expressions which have been employed herein are used as terms of description and not of limitation, and there is no intention in the use of such terms and expressions of excluding any equivalents of the features shown and described or portions thereof, but it is recognized that various modifications are possible within the scope of the present disclosure. Thus, it should be understood that although the present disclosure has been specifically disclosed in part by preferred embodiments, exemplary embodiments, and optional features, modification and variation of the concepts herein disclosed may be resorted to by those skilled in the art, and such modifications and variations are considered to be within the scope of this present description.

It will also be appreciated that systems, devices, products, kits, methods, and/or processes, according to certain embodiments of the present disclosure may include, incorporate, or otherwise comprise properties or features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

All references cited in this application are hereby incorporated in their entireties by reference to the extent that they are not inconsistent with the disclosure in this application. It will be apparent to one of ordinary skill in the art that methods, devices, device elements, materials, procedures, and techniques other than those specifically described herein can be applied to the practice of the described embodiments as broadly disclosed herein without resort to undue experimentation. All art-known functional equivalents of methods, devices, device elements, materials, procedures, and techniques specifically described herein are intended to be encompassed by this present disclosure.

When a group of materials, compositions, components, or compounds is disclosed herein, it is understood that all individual members of those groups and all subgroups thereof are disclosed separately. When a Markush group or other grouping is used herein, all individual members of the group and all combinations and sub-combinations possible of the group are intended to be individually included in the disclosure.

The above-described embodiments are examples only. Alterations, modifications, and variations may be effected to the particular embodiments by those of skill in the art without departing from the scope of the description, which is defined solely by the appended claims.

What is claimed is:

1. A gear system, comprising:
   a shaft comprising a gear, the shaft comprising, on each side of the gear;
   a first region with a first radius;
   a second region with a second radius larger than the first radius, the second region coupled to the first region by a first slope;

a third region with a third radius larger than the second radius, the third region coupled to the second region by a second slope;

wherein the third region is closest to the gear;

a shoulder coupled to each second region, each shoulder pressed onto the shaft and configured to have an interference fit with the second region, and further configured to be stopped by the second slope; and a bearing coupled about the shaft at each first region;

wherein each shoulder is configured to restrain movement of the shaft within a drive train.

2. The gear system of claim 1, further comprising one or more oil passages in the shaft between the shoulder and the bearing.

3. The gear system of claim 2, wherein one or more chamfers are created on the one or more oil passages before the shoulder is pressed onto the shaft.

4. The gear system of claim 3, wherein the one or more chamfers has a tolerance of 0.015±0.010.

5. The gear system of claim 1, wherein the shaft and the shoulder comprise the same material.

6. The gear system of claim 1, wherein the shaft and the shoulder comprise materials with the same coefficient of thermal expansion.

7. The gear system of claim 1, wherein the shaft comprises a portion of a drive system in an aircraft.

8. The gear system of claim 1, wherein the shoulder is pressed onto the shaft in a thermal expansion process.

9. A method of building a gear system, comprising:
providing a shaft comprising a gear, the shaft extending from each side of the gear, the shaft and the gear being monolithic with one another, wherein the shaft comprises, on each side of the gear;
(a) a first region with a first radius;
(b) a second region with a second radius larger than the first radius, the second region coupled to the first region by a first slope; and
(c) a third region with a third radius larger than the second radius, the third region coupled to the second region by a second slope, wherein the third region is closest to the gear; and pressing one or more shoulders onto the shaft, the one or more shoulders configured to have an interference fit with the shaft.

10. The method of claim 9, wherein the one or more shoulders is configured to have an interference fit with the second region and to be stopped by the second slope.

11. The method of claim 9, further comprising coupling a bearing about the shaft outside of the one or more shoulders, wherein each bearing and shoulder are configured to restrain movement of the shaft within a drive system.

12. The method of claim 9, wherein the shaft comprises threads, and wherein the method further comprises coupling a nut to the threads outside of the one or more shoulders.

13. The method of claim 9, further comprising providing one or more oil passages in the shaft.

14. The method of claim 13, further comprising, prior to pressing the shoulder onto each end of the shaft, creating an edge break onto one or more edges of the one or more oil passages.

15. The method of claim 9, wherein the shoulder comprises a shoulder slope configured to abut the second slope.

16. The method of claim 9, wherein the pressing comprises a thermal expansion process.

17. A method of operating a gear system, comprising:
driving, with a power source, a shaft within the gear system, the shaft comprising a gear and having one or more shoulders pressed onto it, wherein the shaft extends beyond each side of the gear, wherein the shaft comprises, on each side of the gear;
(a) a first region with a first radius;
(b) a second region with a second radius larger than the first radius, the second region coupled to the first region by a first slope; and
(c) a third region with a third radius larger than the second radius, the third region coupled to the second region by a second slope, wherein the third region is closest to the gear; and
transferring power from the gear to another component.

18. The method of claim 17, wherein the one or more shoulders is configured to have an interference fit with the second region and to be stopped by the second slope.

* * * * *